United States Patent
Hayes, Jr. et al.

(10) Patent No.: US 7,496,913 B2
(45) Date of Patent: Feb. 24, 2009

(54) MONITORING AND DISPLAYING PROGRESS OF SILENT INSTALLATION OF A SUBORDINATE PROGRAM

(75) Inventors: Kent Fillmore Hayes, Jr., Chapel Hill, NC (US); Anne Frances Ross, Cary, NC (US); Robert Thomas Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/134,722

(22) Filed: May 19, 2005

(65) Prior Publication Data

US 2006/0265707 A1 Nov. 23, 2006

(51) Int. Cl.
*G06F 9/44* (2006.01)
*G06F 9/445* (2006.01)

(52) U.S. Cl. .................. 717/174; 717/125; 717/127
(58) Field of Classification Search ......... 717/174–178, 717/124, 127
See application file for complete search history.

(56) References Cited

U.S. PATENT DOCUMENTS

| 6,744,450 | B1 | 6/2004 | Zimniewicz et al. | 345/841 |
| 6,789,215 | B1 * | 9/2004 | Rupp et al. | 717/173 |
| 2002/0129355 | A1 * | 9/2002 | Velten et al. | 717/176 |
| 2004/0003131 | A1 * | 1/2004 | Curtis | 709/315 |

OTHER PUBLICATIONS

Rotaru, "Advanced Installer 1.9—Windows MSI Authoring", Javalobby.org, JDocs.com, including the linked Caphyon documents ("Java Installer—Advanced Installer: Overview, Features List and Screen Shot," Caphyon Ltd., 2002-2005), Sep. 20, 2004, 9 pages.
"Installing Commerce Server 2000", Upgrading a Commerce Server Final Preview Installation, Microsoft Corporation, last reviewed Aug. 21, 2001, 26 pages.
"Installing the SDX Software", Juniper Networks, Inc., 1998-2005, 8 pages.
"Silent and Non-Interactive Install", Appendix D, Oracle Developer Suite: Installation Guide 10g (9.0.4) for Windows, Linux, Solaris, and HP-UX, Part No. B10579-02, Mar. 2004, pp. i-vii and D-1-D-6.
"Workshare DeltaView 2.9 Install and Configuration Assistant Guide", www.workshare.net, pp. 1-12.
Brelsford, "Digging Deeper into Group Policy", Windows Foundations, Redmongmag.com, Feb. 7, 2005, 6 pages.

* cited by examiner

*Primary Examiner*—Wei Y Zhen
*Assistant Examiner*—Ryan D Coyer
(74) *Attorney, Agent, or Firm*—Duke W. Yee; Robert Straight; Gerald H. Glanzman

(57) ABSTRACT

Monitoring silent installation of a subordinate program on one or more data processing systems. While the subordinate program is being installed silently, at least one activity associated with the installation is monitored. As each activity is performed, a status report regarding the progress of the installation is updated. The process of updating the status report is performed independently of any installation program associated with the subordinate program. The status report is displayed to a user so that the user knows that the installation of a primary target program has not hung during installation of the subordinate program.

3 Claims, 3 Drawing Sheets

MONITORING AND DISPLAYING PROGRESS OF SILENT INSTALLATION OF A SUBORDINATE PROGRAM

BACKGROUND OF THE INVENTION

1. Technical Field

The present invention relates generally to an improved data processing system and in particular to a method and apparatus for processing data. Still more particularly, the present invention relates a method, apparatus, and computer useable code for monitoring silent installation of a subordinate program.

2. Description of Related Art

Installation of a desired primary target program on one or more data processing systems may require installation of a number of additional subordinate, including prerequisite, programs. The subordinate programs may not be required, though the subordinate programs may be useful to operation of the desired primary target program. Installation of each program may require input and installation of each program may need to be performed in a particular order. Consequently, the installation of a desired primary target program may be quite complex.

A known method for managing the complexity of installing multiple programs is to perform a silent installation. An installation is referred to as a silent installation when all of the tasks associated with the installation are automated and the tasks are hidden from the user.

Installation of many programs, which may be quite large, can take significant time. Because the installation is silent, the user is not informed about the progress of the installation until installation of all programs is complete. If an error occurs during installation and the installation or the computer hangs (ceases responding), then the user will not know about the error until too much time has passed, whereupon the user has wasted time and resources before dealing with the problem. On the other hand, because the installation takes a long time, the user may mistakenly believe that the installation has hung even when the installation is still in progress. Thus, the user may mistakenly restart the installation process and, again, waste valuable time and resources.

To address this problem, a silent install may be modified somewhat so that overall progress of installation of the primary target program is displayed. For example, a progress bar or an activity report may be displayed to the user. However, the progress bar or activity report does not show or report any activity during the installation of the subordinate programs. A user may again believe that the installation of the primary target program has hung, even though a subordinate program is still being installed. Thus, it would be advantageous to have an improved method, apparatus, and computer useable code for monitoring progress of silently installed subordinate programs during installation of a primary target program.

BRIEF SUMMARY OF THE INVENTION

The present invention provides a method, apparatus, and computer useable code for monitoring silent installation of a subordinate program on one or more data processing systems. While the subordinate program is being installed silently, at least one activity associated with the installation is monitored. As each activity is performed, a status report regarding the progress of the installation is updated. The process of updating the status report is performed independently of any installation program associated with the subordinate program. The status report is displayed to a user so that the user knows that the installation of a primary target program has not hung during installation of the subordinate program.

BRIEF DESCRIPTION OF THE SEVERAL VIEWS OF THE DRAWINGS

The novel features believed characteristic of the invention are set forth in the appended claims. The invention itself, however, as well as an illustrative mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
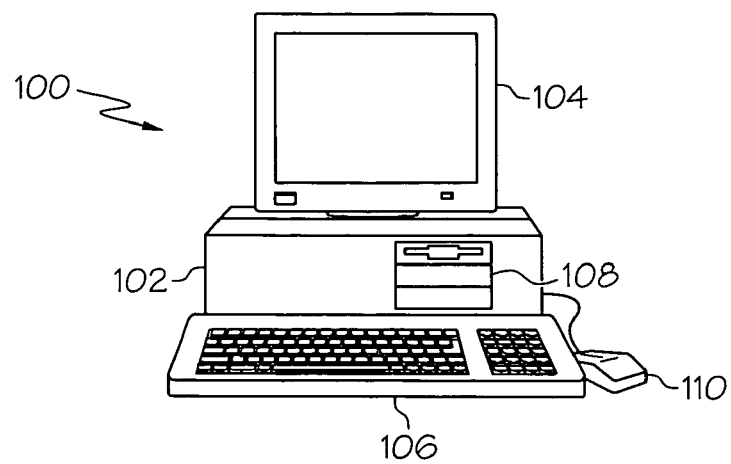
FIG. 1 is a pictorial representation of a data processing system in which the present invention may be implemented.

With reference now to the figures and in particular with reference to FIG. 1, a pictorial representation of a data processing system in which the present invention may be implemented is depicted. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation™ computer, which are products of International Business Machines Corporation™, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
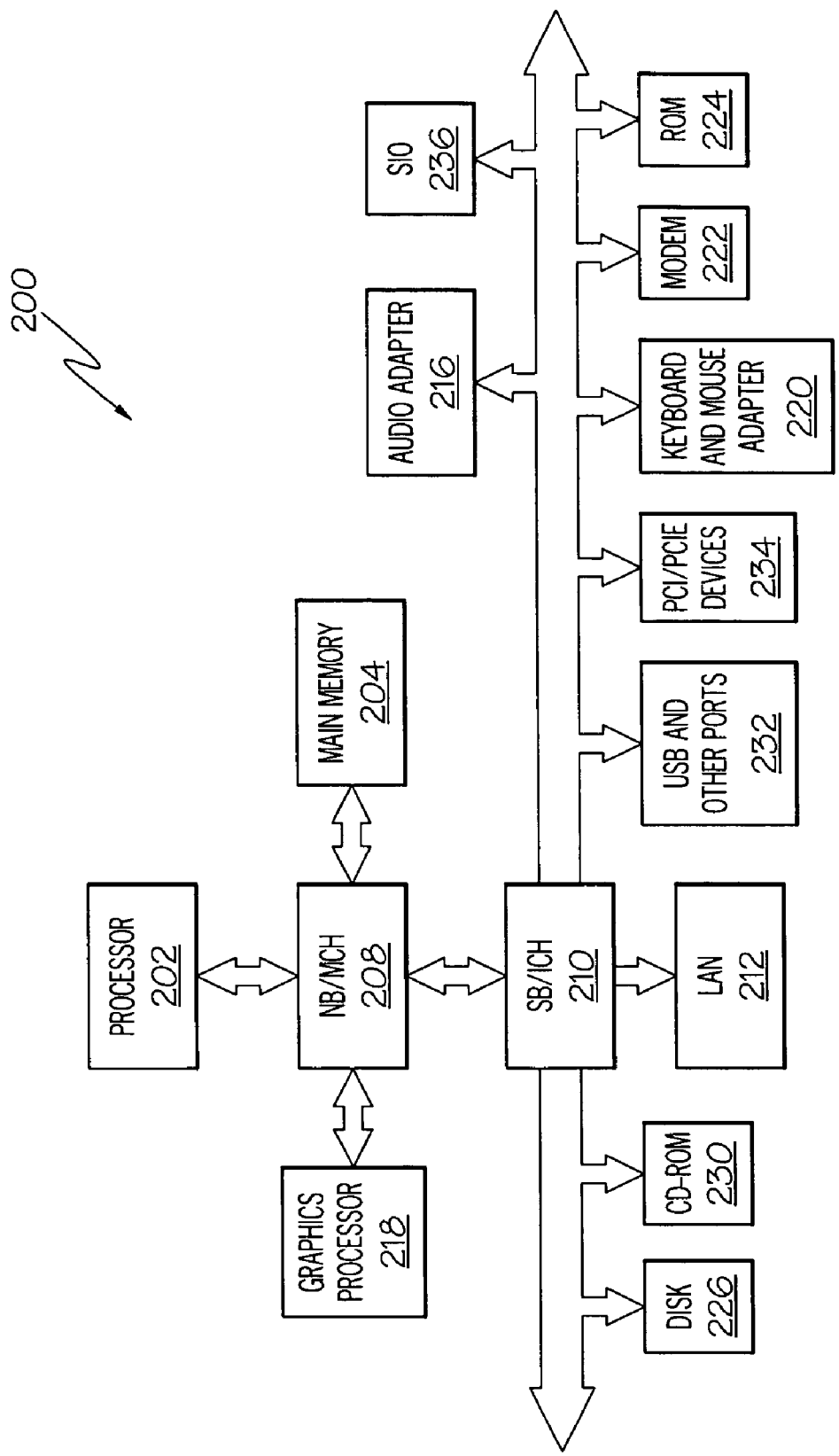
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 connect to ICH 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and coordinates and provides control of various components within data processing system 200 in FIG. 2. The operating system may be a commercially available operating system such as MICROSOFT® WINDOWS® XP (Microsoft and Windows are trademarks of Microsoft Corporation™ in the United States, other countries, or both). An object oriented programming system, such as the Java® programming system, may run in conjunction with the operating system and provides calls to the operating system from Java programs or applications executing on data processing system 200 (Java® is a trademark of Sun Microsystems, Inc.™ in the United States, other countries, or both).

Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 204 or a cache such as found in MCH 208. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention provides a method, apparatus, and computer useable code for monitoring silent installation of a subordinate program on one or more data processing systems. While the subordinate program is being installed silently, at least one activity associated with the installation is monitored. As each activity is performed, a status report regarding the progress of the installation is updated. The process of updating the status report is performed independently of any installation program associated with the subordinate program. The status report is displayed to a user so that the user knows that the installation of a primary target program has not hung during installation of the subordinate program.

Figure 3:
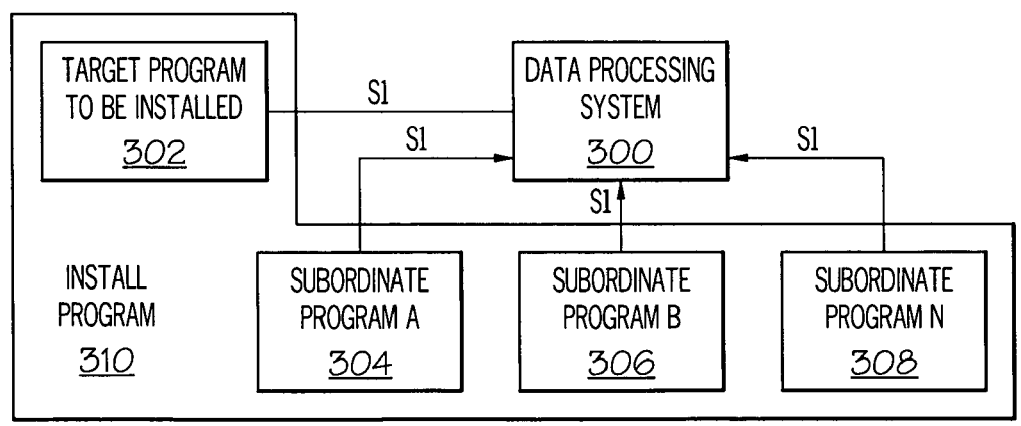
FIG. 3 is a block diagram illustrating installation of a primary target program and a number of subordinate programs on a data processing system in accordance with an illustrative embodiment of the present invention.

FIG. 3 is a block diagram illustrating installation of a primary target program and a number of subordinate programs on a data processing system in accordance with an illustrative embodiment of the present invention. A subordinate program may be a program that is a prerequisite for a primary target program. In this case, the subordinate program must be installed on a data processing system before installing the primary target program. A subordinate program may also be a program that is associated with the primary target program. In this case, the subordinate program uses, is used by, or is used with the primary target data processing system, though the subordinate program is somehow secondary in purpose to the primary target program. Data processing system 300 may be data processing system 100 shown in FIG. 1 or data processing system 200 shown in FIG. 2.

A user desires that data processing system 300 have primary target program 302 installed on it. However, primary target program 302 uses a number of subordinate programs, including subordinate program A 304, subordinate program B 306, and a number of additional subordinate programs, up to subordinate program N 308. In an illustrative embodiment, primary target program 302 requires that subordinate programs 304, 306, and 308 be installed on data processing system 300 before primary target program 302 can be installed. For example, subordinate programs 304, 306, and 308 may provide the foundation necessary to install primary target program 302. In other illustrative embodiments, primary target program 302 does not require subordinate programs 304, 306, and 308, but the subordinate programs are associated in some way with primary target program 302. For example, subordinate programs 304, 306, and 308, may be programs that collect information about the operation of primary target program 302, but that do not need to be installed on data processing system 300 before installing primary target program 302.

As an overall task, installation of primary target program 302 and subordinate programs 304, 306, and 308 can be time-consuming and complicated. Hence, installation of primary target program 302 and subordinate programs 304, 306, and 308 is performed silently in the illustrative example.

To prevent a user from mistakenly believing that installation of primary target program 302 has hung during installation of one of subordinate programs 304, 306, or 308, the mechanism of the present invention provides a method of monitoring installation of the subordinate program. Installation program 310 used to install the subordinate program, or a separate program used to monitor the installation of the subordinate program, may gather information regarding activities performed during the installation of each subordinate program. The process of gathering information regarding activities is described in further detail with regard to the process shown in FIG. 4.

Installation program 310 may be executed on data processing system 300 or may be executed on a remote data processing system. In the latter case, instructions from the installation program are transferred over a network, which may be the Internet. In any case, based on the activities performed, a status report regarding the progress of the installation of a subordinate program is generated and displayed to the user, as described further below.

Figure 4:
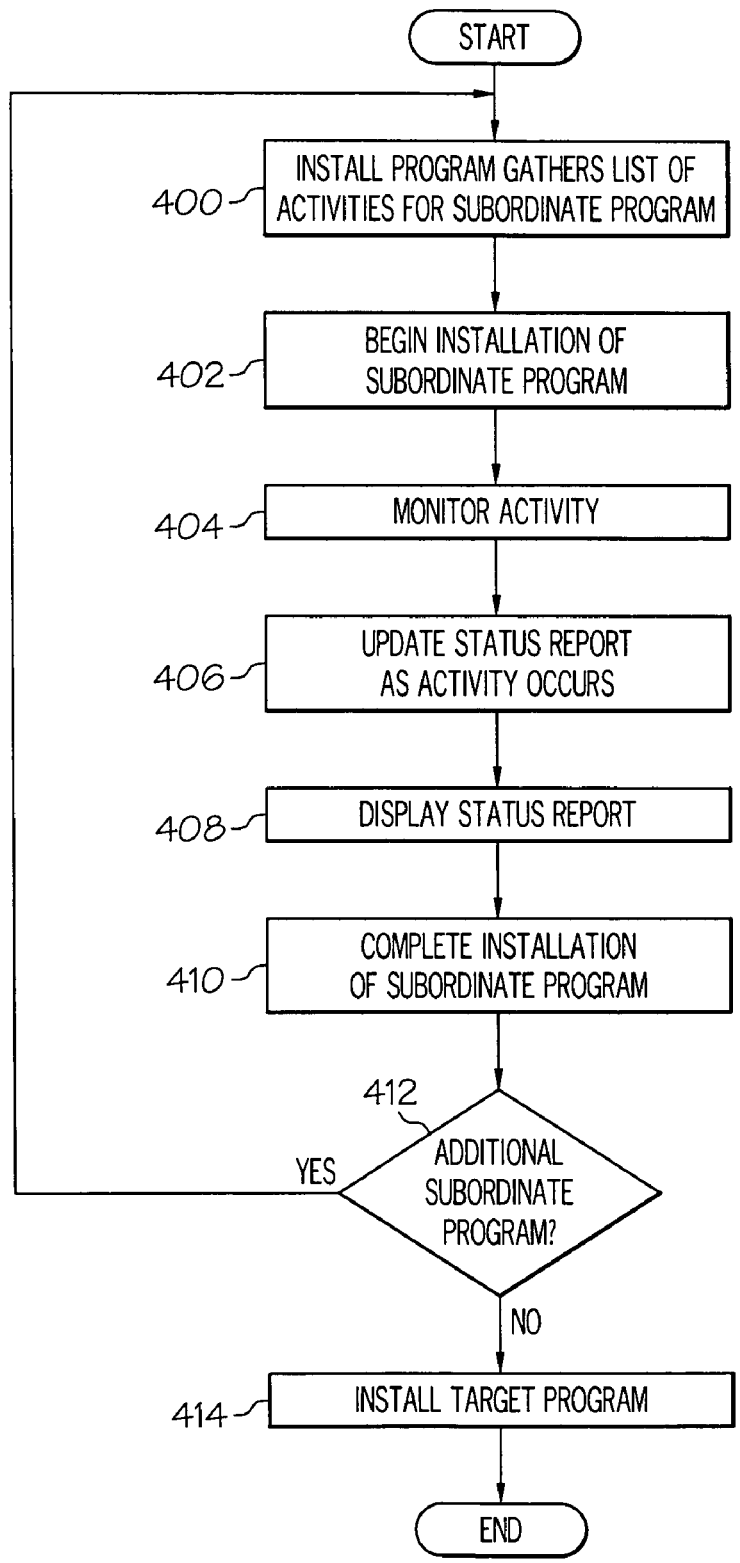
FIG. 4 is a flowchart of a method of monitoring progress of silent installation of a subordinate program in accordance with an illustrative embodiment of the present invention.

FIG. 4 is a flowchart of a method of monitoring progress of silent installation of a subordinate program in accordance with an illustrative embodiment of the present invention. The method shown in FIG. 4 may be performed using a primary installation program, such as installation program 310 in FIG.

3. The primary installation program is primarily responsible for the overall installation process of the primary target program, and may be responsible for the installation of the subordinate programs as well. The primary installation program may also coordinate one or more subordinate installation programs designed to install corresponding subordinate programs. In addition, the process shown in FIG. 4 may be performed in any data processing environment, such as the data processing environment shown in FIG. 3. The target data processing system or systems and any additional data processing systems used to execute the installation program may be a client, a server, data processing system 100 shown in FIG. 1, data processing system 200 shown in FIG. 2, or any other suitable data processing system.

In an illustrative embodiment, the process begins at step 402 with beginning the installation of a subordinate program. However, optionally, the process may begin as a primary installation program gathers a list of activities performed during installation of a subordinate program (step 400). During step 400, the process of gathering the list of activities may be passive or active. If passive, the subordinate program or one or more subordinate installation programs provide the primary installation program with a list of activities performed during installation of the subordinate programs. If active, the primary installation program queries subordinate installation programs or the subordinate programs themselves for activities performed during the installation of the subordinate programs.

An activity may be any number of actions taken during the installation of a program. For example, an activity may be a completed transfer of a file to the target data processing system or a partial transfer of a file to the target data processing system. An activity may also be adding an element, such as a string or file, to the registry or environmental settings of an operating system, such as WINDOWS® or UNIX®. An activity may also be adding elements to a user interface present on the data processing system, such as adding an element, such as an icon or file, to the desktop or to the Start Menu™ of the WINDOWS® operating system. An activity may also be observing the output of an installation program, such as a log or a specific set of strings. For example, a log could contain information regarding the configuration settings of the program to be installed or the status of installation files. Furthermore, a string such as "The Server Has Been Installed" could designate that that activity was completed. An activity may also include determining the timestamps of files to be transferred to the target data processing system, creating a list of the files that will be installed sequentially, and updating the progress of an installation of a file by one percent per predetermined time increment based on the timestamp. The predetermined time increment depends on the size of the file and the transfer rate. A number of additional activities may be monitored using a number of additional methods.

In any case, the installation of one or more of the subordinate programs begins (step 402). The primary installation program, or other monitoring agent, then monitors activities performed during the installation of the subordinate programs (step 404).

In an illustrative embodiment, the primary installation program or other agent detects that an activity is in progress. Optionally, the primary installation program places the pending activity in a list. The primary installation program observes pending activities in the list for completion of each activity.

As activities occur, the primary installation program or other agent updates a status report of the installation of the subordinate programs (step 406). Whether or not the activity is placed in a list, the activity is monitored such that the status report of the installation of the subordinate program is updated upon completion of the activity.

In an illustrative embodiment, the processes of monitoring the installation of the subordinate program and updating the status report are performed without involving an installation program associated with the subordinate program. Thus, the process shown in FIG. 4 may be performed independently of individual subordinate installation programs.

For example, in an illustrative embodiment, the primary installation program or a monitoring program monitors the installation of the subordinate program. The primary installation program or monitoring program detects that a file, ABC, is being transferred to the target data processing system. When the transfer of file ABC is complete, the status report is updated via the primary installation program. In this illustrative example, the subordinate program and the installation program associated with the subordinate program are uninvolved in reporting the status of the installation of the subordinate program.

In another illustrative example, using the system shown in FIG. 3, after a file from subordinate program A 304 has been transferred to data processing system 300, the status report of the installation of subordinate program A 304 is updated. In yet another example, once ten percent of a file from subordinate program B 306 has been transferred to data processing system 300, the status report of the installation of subordinate program B 306 is updated. In yet another example, once a string associated with subordinate program N 308 has been added to the WINDOWS® registry on data processing system 300, the status report of the installation of subordinate program N 308 is updated.

Multiple activities and subordinate installations may be monitored simultaneously or sequentially and the status report of a corresponding installation updated as each activity occurs. For example, the WINDOWS® registry may be monitored and the transfer status of files may be monitored simultaneously. On the other hand, if files are to be transferred sequentially, then the installation program monitors the sequential installation of each file transferred and updates the installation status report accordingly.

As the status report of the subordinate programs is updated, the installation program or other monitoring program causes the updated status report to be displayed (step 408). Thus, a user may see the progress of the installation status of the subordinate program. In an illustrative embodiment, the display of the updated status report is a progress bar that increments to the right as activities occur. In a similar illustrative embodiment, the progress bar showing installation progress of the subordinate program pops up in addition to the progress bar of the installation of the primary target program. Thus, the user may be assured that the installation of both the primary target program and the subordinate program are proceeding and have not hung. In another illustrative embodiment, the display of the updated status report is a user interface that shows details related to the installation. For example, a window may be presented to a user and each activity is reported as each activity begins, proceeds, or is completed. Each separate activity in the window may be represented by a progress bar. In another embodiment, the status report need not be displayed or is optionally displayed.

After all activities associated with installation of a subordinate program have been completed, the installation of the subordinate program continues until completed (step 410). Then, the installation program makes a determination whether additional subordinate programs are to be installed on the target data processing system (step 412). If so, then the process returns to step 400 and the process is repeated. If no additional subordinate programs are to be installed, the installation of the primary target program may start or, if already started, may continue (step 414). Thereafter the process terminates.

In another illustrative embodiment, the process shown in FIG. 4 is performed simultaneously for one or more of the subordinate programs. In addition, the order of steps may vary. For example, the determination of additional subordinate programs (step 412) may be performed before or after any other step.

During the installation process shown in FIG. 4, the primary installation program, a subordinate installation program, or other monitoring program may define a set of error activities. An error activity may be the failure of a file to transfer to the target data processing system, the failure to communicate with hardware or software, the failure to produce a log, the entry of an error into an error log, or any other error or signal representing an error. When any of the error activities are detected, the installation of the appropriate subordinate program may have failed, either partially or completely. A failure, or any other error activity, may be recorded in an error log and/or displayed to the user. The process of monitoring, detecting, and displaying errors in the installation of any subordinate program or in the installation of the primary target program may take place during any step of the installation process of the respective subordinate programs or of the primary target program.

In addition, the installation program, or other monitoring program, can consolidate all error codes or error signals generated by the installation of each individual program into one error log. A user may use the consolidated error log to more easily and quickly determine errors, determine the sources of errors, and take appropriate action or actions.

The mechanism of the present invention has several advantages over currently available methods for installing subordinate programs associated with a primary target program. For example, a user may directly see the installation status of large subordinate programs during the installation of a primary target program. Thus, the user is less likely to arrive at false conclusions regarding whether an error has occurred during installation of either the primary target program or any subordinate programs. In addition, the mechanism of the present invention may be used to consolidate all error signals that occur during installation, such that a user can more readily assess installation problems and take appropriate action.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for monitoring silent installation of a subordinate program during installation of an associated primary target program, the computer implemented method comprising:

gathering a list of a plurality of activities performed during the silent installation of the subordinate program, wherein the plurality of activities comprises installation of a file, partial installation of the file, adding an element to an operating system registry, defining the element with regard to an operating system environmental setting, adding the element to a user interface, and production of a log message;

beginning the silent installation of the subordinate program;

monitoring the silent installation of the subordinate program, wherein the monitoring comprises monitoring the plurality of activities performed during the silent installation of the subordinate program, wherein activities of the plurality of activities that are performed simultaneously are monitored simultaneously, and wherein activities of the plurality of activities that are performed sequentially are monitored sequentially;

displaying a status report of the silent installation of the subordinate program, wherein displaying the status report of the silent installation of the subordinate program comprises updating the displayed status report of the silent installation of the subordinate program as each of the plurality of activities is performed, wherein the steps of monitoring and updating are performed independently of an installation program associated with the subordinate program, and wherein updating the displayed status report of the silent installation of the subordinate program as each of the plurality of activities is performed comprises:

displaying a progress bar for each activity of the plurality of activities; and updating the progress bar for each activity of the plurality of activities as each activity is performed, wherein the progress bar for each activity is updated as each activity is started, as each activity proceeds, and as each activity is completed;

completing the silent installation of the subordinate program;

responsive to completing the silent installation of the subordinate program, determining whether there is a further subordinate program to be installed;

responsive to determining that there is not a further subordinate program to be installed, installing the primary target program;

determining errors that occur during silent installation of the subordinate program and during installing of the primary target program;

consolidating the determined errors into a consolidated error log; and displaying the consolidated errors to a user.

2. A computer program product comprising:

a computer recordable-type storage medium having computer usable program code embodied therein for monitoring silent installation of a subordinate program during installation of an associated primary target program, the computer program product comprising:

computer usable program code for gathering a list of a plurality of activities performed during the silent installation of the subordinate program, wherein the plurality of activities comprises installation of a file, partial installation of the file, adding an element to an operating system registry, defining the element with regard to an operating system environmental setting, adding the element to a user interface, and production of a log message;

computer usable program code for beginning the silent installation of the subordinate program;

computer usable program code for monitoring the silent installation of the subordinate program, wherein the monitoring comprises monitoring the plurality of activities performed during the silent installation of the subordinate program, wherein activities of the plurality of activities that are performed simultaneously are monitored simultaneously, and wherein activities of the plurality of activities that are performed sequentially are monitored sequentially;

computer usable program code for displaying a status report of the silent installation of the subordinate program, wherein displaying the status report of the silent installation of the subordinate program comprises updating the displayed status report of the silent installation of the subordinate program as each of the plurality of activities is performed, wherein the steps of monitoring and updating are performed independently of an installation program associated with the subordinate program, and wherein updating the displayed status report of the silent installation of the subordinate program as each of the plurality of activities is performed comprises:

computer usable program code for displaying a progress bar for each activity of the plurality of activities; and computer usable program code for updating the progress bar for each activity of the plurality of activities as each activity is performed, wherein the progress bar for each activity is updated as each activity is started, as each activity proceeds, and as each activity is completed;

computer usable program code for completing the silent installation of the subordinate program;

responsive to completing the silent installation of the subordinate program, computer usable program code for determining whether there is a further subordinate program to be installed;

responsive to determining that there is not a further subordinate program to be installed, computer usable program code for installing the primary target program;

computer usable program code for determining errors that occur during silent installation of the subordinate program and during installing of the primary target program;

computer usable program code for consolidating the determined errors into a consolidated error log; and computer usable program code for displaying the consolidated errors to a user.

3. A data processing system comprising:

a bus;

a memory operably connected to the bus, wherein the memory contains a set of instructions for monitoring silent installation of a subordinate program during installation of an associated primary target program; and a processor operably connected to the bus, the processor adapted to execute the set of instructions to gather a list of a plurality of activities performed during the silent installation of the subordinate program, wherein the plurality of activities comprises installation of a file, partial installation of the file, adding an element to an operating system registry, defining the element with regard to an operating system environmental setting, adding the element to a user interface, and production of a log message; begin the silent installation of the subordinate program; monitor the silent installation of the subordinate program, wherein the monitoring comprises monitoring the plurality of activities performed during the silent installation of the subordinate program, wherein activities of the plurality of activities that are performed simultaneously are monitored simultaneously, and wherein activities of the plurality of activities that are performed sequentially are monitored sequentially display a status report of the silent installation of the subordinate program, wherein displaying the status report of the silent installation of the subordinate program comprises update the displayed status report of the silent installation of the subordinate program as each of the plurality of activities is performed, wherein the monitoring and updating are performed independently of an installation program associated with the subordinate program, and wherein updating the displayed status report of the silent installation of the subordinate program as each of the plurality of activities is performed comprises display a progress bar for each activity of the plurality of activities; and update the progress bar for each activity of the plurality of activities as each activity is performed, wherein the progress bar for each activity is updated as each activity is started, as each activity proceeds, and as each activity is completed; complete the silent installation of the subordinate program; responsive to completing the silent installation of the subordinate program, determine whether there is a further subordinate program to be installed; responsive to determining that there is not a further subordinate program to be installed, install the primary target program; determine errors that occur during silent installation of the subordinate program and during installing of the primary target program; consolidate the determined errors into a consolidated error log; and display the consolidated errors to a user.

* * * * *